Patented Feb. 12, 1929.

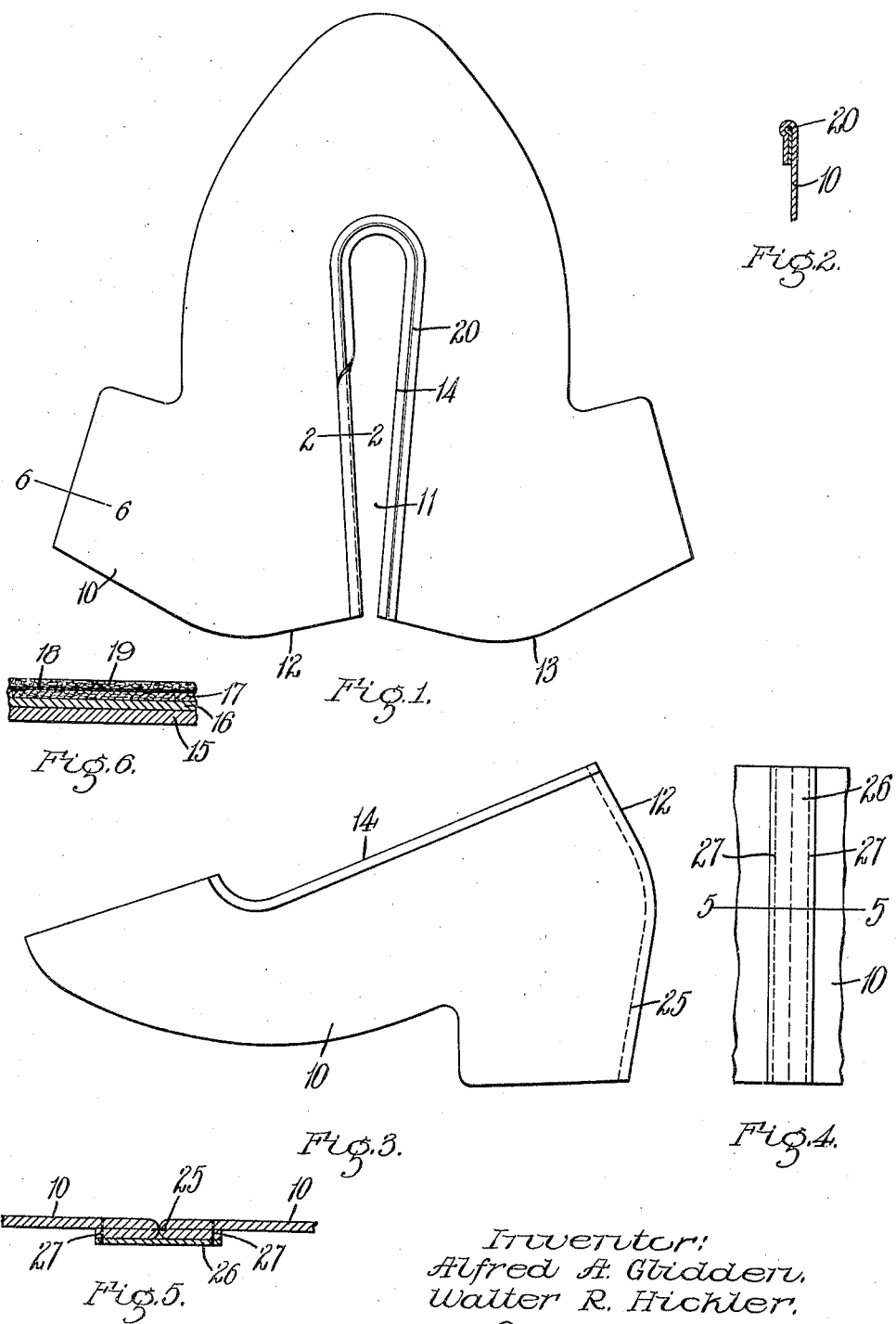

1,701,612

UNITED STATES PATENT OFFICE.

ALFRED A. GLIDDEN, OF WATERTOWN, AND WALTER R. HICKLER, OF WESTON, MASSACHUSETTS, ASSIGNORS TO HOOD RUBBER COMPANY, OF WATERTOWN, MASSACHUSETTS, A CORPORATION OF MASSACHUSETTS.

WATERPROOF UPPER FOR OVERSHOES.

Application filed April 6, 1928. Serial No. 267,942.

This invention relates to an improved waterproof upper for overshoes.

The object of the invention is to provide an upper for overshoes preferably waterproof, said upper being composed substantially of a single sheet of material which may represent woolen, felted and knitted fabrics, or certain soft tanned leathers. When ground leather is used for the outer layer of the fabric forming the upper, a leather appearance is given to the upper. Pigments may be used in the said upper to obtain fine decorative effects. When long hair is used on the outer surface of the upper, a fur effect may be obtained. Thus it will be seen that according to the material used on the outer face of the fabric, different appearing materials may be produced.

The object of the invention is, therefore, to provide a waterproof upper for overshoes which, while presenting the appearance on the outside of a fabric or of soft leather, shall have a stockinette or other desired inner face, while intermediate the inner and outer faces there are two layers of elastic gum compound.

While embodying these characteristics, the invention embodies an upper, the different materials of which it is composed being so associated and intermingled as to form in function and in effect a single-ply material.

Another object of the invention is to complete the upper before any part of it is placed on the last in the manufacture of the shoe as distinguished from the prior art in overshoe manufacture, wherein the upper was constructed of a plurality of pieces of material and built up piece by piece on the last.

The upper of this invention consists of a sheet of material which has, in combination, an inner layer, preferably of fabric, an outer layer of particles of material, preferably fibrous material, such as flock, and an intermediate layer of elastic compound superimposed upon the inner layer of fabric, and another layer of elastic gum compound having incorporated therein a substantial quantity of flock ground leather fiber, wood flour, or the like. To this last-named layer, said outer layer of particles of material is attached by adhesive material.

The shoe upper of this invention is not only waterproof, but is flexible to a high degree, because of the structure embodied therein, and therefore, resists the wearing action of bending to a marked degree.

Prolonged life of the upper of this invention is obtained as it is a well-known fact that articles made of rubber or rubber compound and articles made of rubber or rubber compound coated textile material deteriorate to a greater or less degree when exposed to the action of certain rays of light, such as may be found in sunlight.

In the overshoe upper of this invention the outside layer being composed of millions of small pieces, preferably of fibrous material, which are firmly fixed to and which completely cover the elastic gum compound layer referred to, protect it and the other layer of elastic rubber compound from the penetration of light and from oxidation, thereby greatly prolonging the life of the shoe upper.

If desired, the fiberized surface of the upper may be embossed to produce different effects. The underlying yielding structure of the layers of elastic rubber compound and elastic gum compound being readily formed into any design desired. The fiberized surface of the overshoe upper may be printed upon by employing the well-known process of textile print work, or it may be printed upon by impression, such, for instance, as would be produced by a rotary or platen press.

By depositing different colored fibers in different places on the gum compound surface, designs of many kinds will be readily obtained.

The invention consists in the improved upper for overshoes set forth in the following specification and particularly pointed out in the claims.

Referring to the drawings:

Figure 1 is a plan view of a blank of a piece of material shaped to form an upper for an overshoe.

Fig. 2 is a section taken on line 2—2 of Fig. 1.

Fig. 3 is a side elevation of the upper with the rear edges joined together.

Fig. 4 is a rear elevation of the portion of the upper with a strip of sheet material covering the back seam.

Fig. 5 is a detail section taken on line 8—8, Fig. 7.

Fig. 6 is a detail section very much enlarged, of the sheet material forming the upper taken, for example, on line 6—6, Fig. 1.

Like numerals refer to like parts throughout the several views of the drawings.

In the drawings, 10 is a blank of sheet material from which our improved upper is constructed, the same being bifurcated at 11. 12 and 13 are the rear edges of the upper and 14 is the upper edge. The sheet material of which the upper is composed consists of a layer of sheet material such as fabric 15, a layer 16 of elastic compound such, for example, as rubber compound, a layer 17 of elastic gum compound in which is incorporated a substantial quantity of flock, ground leather fiber, wood flour, or the like, a layer 18 of adhesive material, such as elastic gum cement is applied to the layer 17 and a layer 19 positioned on the layer 18 and consisting of small particles of material which may be fibrous material, such as, flock, where it is desired to produce in the fabric the effect of a woolen, felted, or knitted fabric, or where it is desired to present an appearance of certain soft tanned leathers.

According to the material which is used in the layer 19 and the degree of fineness to which it is ground, different appearances may be given to the shoe upper and the color used for the layer 19 may be varied according to the pigments which are used in said layer, and in the case where pigments are used in the layer 19, the same pigments would preferably be used in the adhesive material for the layer 18, so that as the article is worn it would still keep the same colors. For the layer 15 different materials may be used, such as, woven fabrics, knitted goods, stockinette, and the like. The use of such fabrics depending upon the results which it is desired to attain.

In manufacturing the sheet material of which the upper is composed the layer of fabric 15 may be of woven cloth, or knitted fabric, or other textile fabric, and this is passed through a calender and the elastic compound layer 16 is applied to the fabric layer 15 and is driven by pressure in between the yarns that make up the fabric on one face. This is the well-known coating process regularly carried on in rubber mills. The elastic gum compound layer 17 is applied to the elastic compound layer 16 and a layer consisting of a light coat of elastic gum cement 18 is applied to the elastic gum compound layer 17, the layer 18 constituting an adhesive. The elastic gum cement of the layer 18 may be applied to the layer 17 by passing the layers 15, 16 and 17 over a roll and under a sharp straight edge; then while the elastic gum cement is still sticky and before the solvent therein has evaporated, the cement-coated fabric will next pass underneath a device from which the material with which it is to be faced is delivered. The fibers of the material constituting the layer 19 will project into the soft sticky gum cement of the layer 18 and become intermingled therewith, so that the fibrous material will be embodied in layers 17, 18 and 19. The surplus material not taken up and not firmly positioned upon the gum elastic body or layer 18 is then removed by suction, leaving an even deposit of small pieces of material forming the layer 19, which may be flock or any fibrous material, or other material, according to the desired finish of the material of which the shoe upper is formed.

The machine described for the manufacture of the material of the shoe upper is to be made the subject-matter of a separate application for United States Letters Patent.

In manufacturing the upper of this invention, gum elastic cement is applied to the inner surface of the sheet material which is to form the upper, around the entire edges thereof by brushing or scraping and allowed to dry. A beaded strip of highly elastic gum compound 20 is laid on this cemented surface along the top edge 14. The fabric of the upper at the top is then folded inwardly over the strip 20 and pressed thereagainst, as illustrated in Fig. 2, thus enclosing the elastic gum strip and forming a finished binding for the top of the shoe.

The ends of the upper 12 and 13 are joined together at the back of the upper by lapping one edge over the other and cementing the edges or by stitching together as illustrated in Fig. 4, where the edge portions are stitched together at 25, then folded backwardly against the face of the upper 10 and sewed thereto, together with a fiberized back strip 26 by stitches 27.

In Fig. 3 the upper is shown in side elevation with the inner surface outside and before the fiberized back strip is attached, the two rear edges 12 and 13 being joined together by the row of stitches 25. After the fiberized back strip 26 is attached, as hereinbefore described, the upper is then turned right side out, pulled over a last and fitted into place ready to be completed by attaching thereto the other parts of the shoe.

A completed shoe and the manner of manufacturing the same will be disclosed in a subsequent application for United States Letters Patent, and this completed shoe will embody therein an upper such as hereinbefore set forth, the completed shoe and the upper being vulcanized.

We claim:

1. A waterproof upper for an overshoe embodying therein an inner layer of sheet material, a layer of elastic compound superimposed thereon, a layer of elastic gum compound containing a quantity of fibrous material applied to said layer of elastic compound, and a layer of small particles of material attached to said layer of elastic gum compound by adhesive material.

2. A waterproof upper for an overshoe comprising a bifurcated piece of waterproof sheet material embodying therein an inner layer of fabric, a layer of rubber compound superimposed thereon, a layer of elastic gum compound containing a quantity of fibrous material applied to said layer of rubber compound, and a layer of small particles of material attached to said layer of elastic gum compound by adhesive material.

3. A waterproof upper for an overshoe comprising a bifurcated piece of waterproof sheet material embodying therein a layer of fabric, a layer of rubber compound superimposed thereon, a layer of elastic gum compound containing a quantity of fibrous material applied to said layer of elastic compound and projecting thereinto, and a layer of small particles of material attached to the layer of elastic gum compound by adhesive material.

4. A waterproof upper for an overshoe comprising a bifurcated piece of waterproof sheet material embodying therein an inner layer of frabric, an outer layer of fine particles of fibrous material, a layer of rubber compound applied to said inner layer of fabric, and a layer of gum elastic compound applied to said layer of rubber compound, the upper edge portion of said upper being folded inwardly to form a finished binding around the top.

5. A waterproof upper for an overshoe comprising a bifurcated piece of waterproof sheet material embodying therein a layer of fabric, a layer of rubber compound superimposed thereon and projecting thereinto, a layer of elastic gum compound positioned upon said layer of rubber compound, a layer of small particles of material attached to the layer of elastic gum compound by adhesive material, and a strip of gum elastic compound extending around the upper edge portion of the upper and constituting a finished binding for the top of the upper.

6. A waterproof upper for an overshoe comprising a bifurcated piece of waterproof sheet material embodying therein an inner layer of fabric, a layer of rubber compound superimposed upon said layer of fabric, a layer of elastic gum compound positioned upon said layer of rubber compound, a layer of elastic gum cement on said layer of elastic gum compound and an outer layer of fine particles of fibrous material on said layer of elastic gum cement, and a strip of gum elastic compound enclosed within the inwardly folded upper edge portion of the upper and constituting a finished binding for the top of the upper.

7. A waterproof upper for an overshoe comprising a bifurcated piece of waterproof sheet material embodying therein an inner layer of fabric, a layer of rubber compound superimposed upon said layer of fabric, a layer of elastic gum compound positioned upon said layer of rubber compound, a layer of elastic gum cement on said layer of elastic gum compound, and an outer layer of fine particles of fibrous material on said layer of elastic gum cement, and a strip of gum elastic with a bead extending around the upper edge portion of the upper and constituting a finished binding for the top of the upper.

8. A waterproof upper for an overshoe comprising a bifurcated piece of waterproof sheet material embodying therein an inner layer of fabric, an outer layer of fine particls of fibrous material, a layer of rubber compound superimposed upon said inner layer of fabric, a layer of elastic gum compound superimposed upon said layer of rubber compound upon which said outer layer of fine particles of fibrous material is positioned, the rear edges of said upper being joined together.

9. A waterproof upper for an overshoe comprising a bifurcated piece of waterproof sheet material embodying therein an inner layer of fabric, an outer layer of fine particles of fibrous material, a layer of rubber compound superimposed upon said inner layer of fabric, a layer of elastic gum compound superimposed upon said layer of rubber compound upon which said outer layer of fine particles of fibrous material is positioned, the rear edges of said upper being joined together, and a strip of sheet material covering the rear edges of the upper and fast to said upper on its inner face.

10. A vulcanized waterproof upper for an overshoe embodying therein an inner layer of sheet material, a layer of elastic compound superimposed thereon, a layer of elastic gum compound containing a quantity of fibrous material applied to said layer of elastic compound, and a layer of small particles of material attached to said layer of elastic gum compound by adhesive material.

In testimony whereof we have hereunto set our hands.

ALFRED A. GLIDDEN.
WALTER R. HICKLER.